US008036347B1

(12) United States Patent
Kanade

(10) Patent No.: US 8,036,347 B1
(45) Date of Patent: Oct. 11, 2011

(54) METHOD AND APPARATUS PROVIDING ADDITIONAL INFORMATION TO AN INTERACTIVE VOICE RESPONSE (IVR) SYSTEM USER

(75) Inventor: Rajesh Kanade, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 1393 days.

(21) Appl. No.: 11/582,606

(22) Filed: Oct. 18, 2006

(51) Int. Cl.
*H04M 11/00* (2006.01)
(52) U.S. Cl. ........ 379/88.18; 379/9.04; 379/16; 379/17; 379/88.01; 379/88.04; 379/80; 379/251; 379/374.02
(58) Field of Classification Search .................... 379/16, 379/17, 80, 88.01, 88.04, 88.18
See application file for complete search history.

(56) References Cited

U.S. PATENT DOCUMENTS

| 6,711,618 B1* | 3/2004 | Danner et al. ................. 709/228 |
| 2005/0114462 A1* | 5/2005 | Mathew et al. ................ 709/207 |
| 2005/0207545 A1* | 9/2005 | Gao et al. .................... 379/88.17 |

* cited by examiner

*Primary Examiner* — Melur Ramakrishnaiah
*Assistant Examiner* — Yosef K Laekemariam
(74) *Attorney, Agent, or Firm* — Chapin IP Law, LLC; David W. Rouille, Esq.

(57) ABSTRACT

A method, apparatus and computer program product for providing additional information to an Interactive Voice Response (IVR) system user is presented. A call from a user is received at the IVR system, and a session is provided for the user. Additionally, a page is generated for the session. The page is communicated to the user; and is dynamically updated for the user as the user traverses menus of the IVR system.

21 Claims, 3 Drawing Sheets

METHOD AND APPARATUS PROVIDING ADDITIONAL INFORMATION TO AN INTERACTIVE VOICE RESPONSE (IVR) SYSTEM USER

BACKGROUND

Interactive Voice Response (IVR) systems are a telephony technology that can read a combination of touch-tone and voice input provided by a remote user. An IVR system gives users the ability to access a database of information via phone. A typical IVR system has several menus of prerecorded options that the caller can choose from. While many choices are as basic as choosing a number, some options may require the caller to speak detailed information such as his/her name and/or account number. This input is received by the IVR system and is used to access the appropriate information in the database. For example, a bank may have an IVR system that allows members to call in and check their balance or recent transactions. Credit card companies and stock brokerage firms also use IVR systems to allow users to access information from their account. The technology can also be used for other purposes such as phone surveys, checking movie times, call center forwarding and the like.

A contact center is a system which a person can communicate with to receive information. Such communication can include, but is not limited to, telephone calls, Internet access, email, and FAX. A contact center can include one or more interactive voice response (IVR) systems. The one or more IVRs provide automatic branching voice queries to which the caller responds with button pushes on a telephone keypad or with voice responses on a telephone. The contact center may be provided having only the one or more IVR systems, or alternatively, the contact center may be provided having human agents. For example, at the end of the IVR branching voice queries, the caller can be directed to press zero to speak to an agent. In some environments the use of a contact center by a customer is referred to as self-service.

SUMMARY

Conventional mechanisms such as those explained above suffer from a variety of deficiencies. One such deficiency is that when a user calls into an IVR based system, at times users would like to have more information available to them which is shown to them in terms of links, documents, video, images etc. There may also be a need for an enterprise to push extra contents like advertisements based on a user's current choice of menu.

Embodiments of the invention significantly overcome such deficiencies and provide mechanisms and techniques that provide a web-based system which dynamically creates content based on the choice of menus users are making and is presented to the user as a web page. This allows a company to personalize an individual's web experience with a company's web site based on the context and choice of IVR menus selected by the customer during a self-service session with the company's contact center.

Current self-service applications render speech information as a response to a user's request. Embodiments of the present invention dynamically update a web page provided for the user as the user navigates an IVR menu. This web page can be accessed by the end user either while navigating the speech menu or at the end of the dialog. The web page can contain documents, video or audio related to the dialog session that the user is having or just completed. In the self-service workflow, nodes are enhanced to contain meta information that is not rendered in speech, and this meta information is used in creating or updating the web page for the self-service user.

In a particular embodiment of a method of providing additional information to an Interactive Voice Response (IVR) system user, the method includes receiving at the IVR system, a call from a user and providing a session for the user. The method further includes generating a page for the session. Additionally, the method includes communicating the page to the user; and dynamically updating the page for the user as the user traverses menus of the IVR system.

Other embodiments include a computer readable medium having computer readable code thereon for providing additional information to an Interactive Voice Response (IVR) system user. The computer readable medium includes instructions for receiving at the IVR system, a call from a user as well as instructions for providing a session for the user. The computer readable medium also includes instructions for generating a page for the session and instructions for communicating the page to the user. Additionally, the computer readable medium includes instructions for dynamically updating the page for the user as the user traverses menus of the IVR system.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides additional information to an Interactive Voice Response (IVR) system user as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing additional information to an Interactive Voice Response (IVR) system user as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft, N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
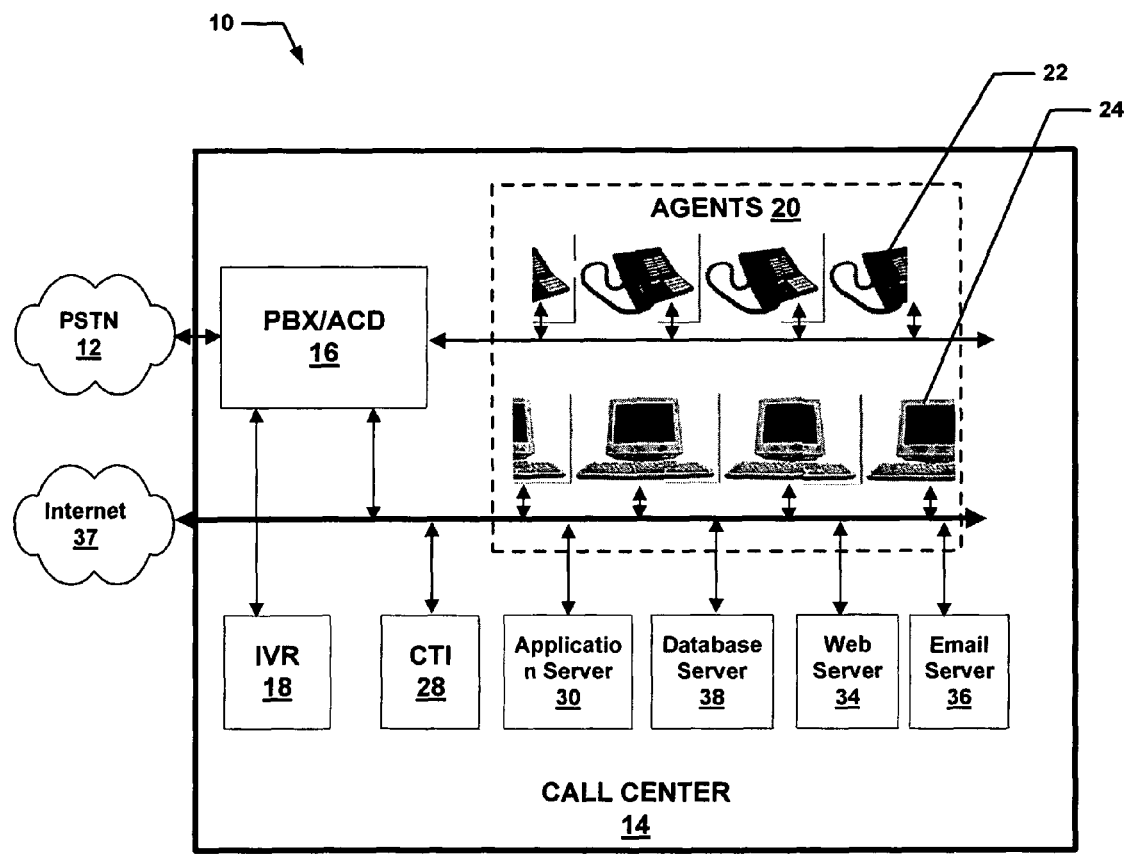
FIG. 1 depicts a block diagram of a call center operating in accordance with embodiments of the present invention.

Referring now to FIG. 1, a call center environment 10 is shown. The call center 14 is connected to the public switched telephone network 12 (PSTN). The PSTN is a worldwide telephone system that provides telephone call connections, including telephone connections to the call center 14. The call center 14 can include a private branch exchange 16 (PBX) usually combined with an automatic call distributor 16 (ACD). The PBX 16 is a sub-system that can route incoming telephone calls to intended call recipients, or agents. The ACD is a sub-system that can provide call queuing and automatic wait handling of incoming telephone calls. The PBX/ACD 16 can be coupled to one or more interactive voice response (IVR) systems 18. The IVR 18 comprises a system that provides voice queries to a telephone caller. Voice queries typically direct the telephone caller through a series of selections that can be chosen by the telephone caller via button pushes on the telephone keypad.

Within the IVR queries, the telephone caller can be directed by the IVR 18 to select an option that connects the telephone caller, via the PBX/ACD 16, to one of a group of agents 20. The agents 20 can have access to agent telephones, of which agent telephone 22 is representative of all agent telephones. The agents 20 can also have access to agent computers, of which agent computer 24 is representative of all agent computers.

The PBX/ACD 16 is further coupled to a network 26 that can be provided to couple together the PBX/ACD 16, the agent computers, for example agent computer 24, a computer telephony integration (CTI) server 28, an application server 30, a database server 32, a web server 34, and an email server 36. The network 26 can correspond, for example, to an Ethernet local area network.

The IVR 18 can, among the IVR selections offered, request that the telephone caller enter "identifying information," for example an account number, by button pushes on the telephone keypad or by voice responses from the telephone caller. Identifying information can also be automatically provided by the PBX/ACD 16 without entry by the telephone caller with a variety of methods, including dialed number identification service (DNIS) and automatic number identification (ANI). The identifying information is passed through the PBX/ACD 16 to the network 26. The CTI 28 receives the identifying information and coordinates the identifying information with "caller data," for example account history associated with the telephone caller, contained in the database server 32. An application program in the application server 30 can automatically provide a display of the caller data in a "screen pop" to the agent disposed upon the agent computer 24. Alternatively, the application program can reside within the agent computer 24.

The call center 14 can also be accessed via the Internet 37, for example by a web user who accesses a web page associated with the call center. The web user, via the Internet 37, connects to the web server 34 for web page access. The web user can also be an email user, in which case the email user connects to the email server 36 via the Internet 37. While web page access and email access have been described herein, the invention is not limited to only these specific Internet applications. A variety of Internet applications can access a variety of servers within the call center 14.

In today's highly and increasingly more computerized and connected world, when placing an IVR service call, especially from the workplace or home, it is very likely that an Internet-connected computer is within arm's reach. In fact many people store service phone numbers, account numbers or other records related to service calls in a computer.

It is also observed that mobile phones are increasingly web enabled & with use of mobiles becoming increasing simpler, it is quite likely to be talking on the phone & at the same time be reading contents displayed in your mobile's browser.

The above observations suggest it is often possible to associate a call with a caller and a computer the caller is logged on, which in turn makes it possible to deliver visual content to the caller from an Internet channel, automatically enabling a multi-channel, multi-modal phone call experience.

In order to imitate a self-service session, a user calls into IVR system. The IVR system creates a unique session for this caller on the application server and creates an Hyper-text Markup Language (HTML) page for this session. This HTML page could either be a blank page or a page which adheres to some template. The IVR communicates the URL of the HTML page to the user. This can be either done by IVR reading out the URL to the user or sending a Short Message Service (SMS) message to the user.

As user navigates thru the voice Menu on the IVR, the HTML page is dynamically updated with other information. What information to populate is driven based on meta information kept with each IVR menu. Since HTML Page is a rich media, contents of the page could be plain text, links to other web pages, Video, Flash Images, attachments etc.

When a user ends his call with IVR system, the HTML Page created in the earlier step could be handled in different ways. The HTML page could be deleted immediately. Alternately, the HTML page could be kept on the server for a certain amount of time to allow the user to access it at a later time. The HTML page could also be sent as an email to a user which can be read in any HTML enabled email client.

Figure 2:
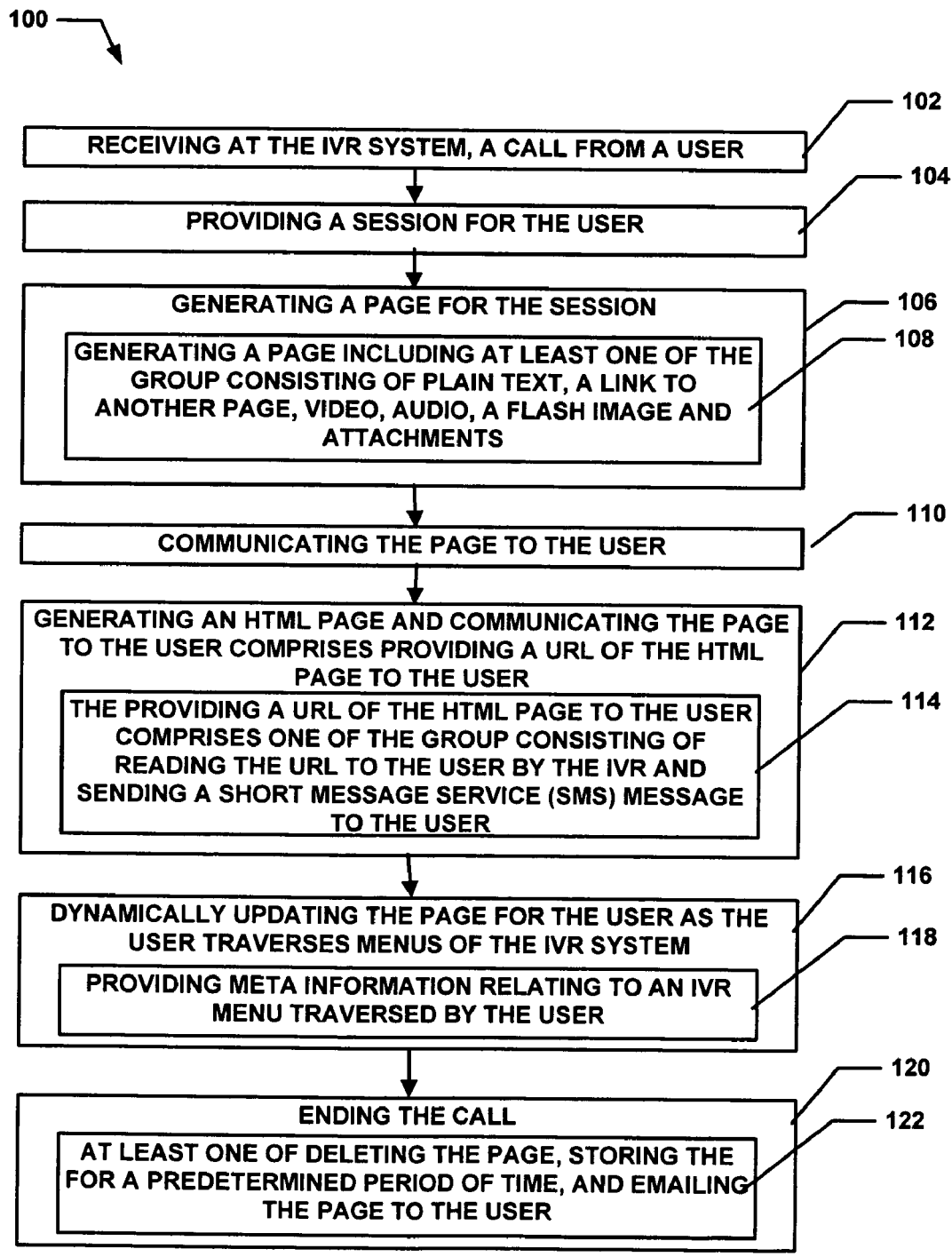
FIG. 2 depicts a flow diagram of a particular embodiment of a method for providing additional information to an IVR system user.

A flow chart of the presently disclosed method is depicted in FIG. 2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2, a particular embodiment of a method 100 of providing additional information to an Interactive Voice Response (IVR) system user is shown.

The method 100 begins with processing block 102 which discloses receiving at the IVR system, a call from a user. The call can be a landline based call or can be a cellular telephone call. In the case where the call is a cellular telephone call, the communications from the IVR application to the user takes place via the cellular communications network. This is followed by processing block 104 which states providing a session for the user.

Processing block 106 recites generating a page for said session. As disclosed in processing block 108, generating a page comprises generating a page including at least one of the group consisting of plain text, a link to another page, video, audio, a flash image and attachments.

Processing continues with processing block 110 which states communicating the page to the user. As shown in processing block 112 generating a page for said session comprises generating a HyperText Mark-up Language (HTML) page and wherein said communicating the page to the user comprises providing a Universal Resource Locator (URL) of the HTML page to said user. Processing block 114 discloses providing a URL of the HTML page to said user comprises one of the group consisting of reading the URL to the user by said IVR and sending a Short Message Service (SMS) message to said user.

Processing block 116 states dynamically updating the page for said user as said user traverses menus of said IVR system. As recited in processing block 118, this may include providing meta information relating to an IVR menu traversed by said user. Thus a user selecting IVR menu items relating to a particular problem the user is experiencing would receive additional information relating to the particular problem.

As shown in processing block 120, after the user has traversed the IVR menus desired, the call is ended. Once the call is ended, processing continues with processing block 122 which discloses at least one of deleting said page, storing said page for a predetermined period of time, and emailing the page to the user.

An example of a particular embodiment of the method of providing additional information to an IVR system user will now be described. In this example a customer has called in to Dell to report a problem he has with installing an extra hard disk he ordered from Dell recently.

A customer calls 1-800-Get-Dell from his office number 1-123-456-7890. The customer is in the comfort of his office and has a desktop in front of him which has Internet connectivity. The customer generated the call, since the customer is having trouble installing an additional hard drive in his system.

The IVR application of the present invention (herein referred to as "Web Assistant"), upon receipt of the call from the customer, creates a unique session for the customer on the application server. The application further creates a new page on the Dell website (e.g., http://www.dell.com/users/11234567890) specifically for this customer. This web page is created exclusively for the customer and is tailored specifically for the customer based on the customer interactions with the self-service application.

The Web Assistant also communicates the URL back to the customer, for example by reading out the above URL. The customer has provided to the application basic information about his system like model number, CPU, RAM size etc. The customer also opens the URL the IVR has communicated to him in the previous step.

Based upon the user input and meta information stored in this menu, the Web Assistant application determines the customer has less RAM on his system. Dell also has promotions on RAMs currently. The Web Assistant dynamically updates the above page for the customer with contents relating to the promotion regarding RAM.

Next, the customer chooses a menu option meant for reporting hard disk related issues. Based on the meta information available, the Web Assistant decides to append to the above web page the following: three links to knowledge based articles which explain in detail how to install an extra hard disk, as well as a video clip which also walks the customer through the process of installing hard disk on a Dell system from start to finish.

The customer now decides to disconnect and end the session. The customer is satisfied with the knowledge based articles and the video clip the Web Assistant has recommended to him. Dell has configured the Web Assistant to persist the pages created for this customer for this session for thirty days.

A week later, the customer is thinking about RAM upgrades. He has previously book marked the page http://www.dell.com/users/11234567890 which was created for him when he called Dell IVR a week back. The customer navigates to the above page and looks for the RAM related promotion and goes on to shop from there.

In such a manner a company is able to personalize an individual's web experience with a company's web site based on the context and choice of IVR menus selected by the customer during a self-service session with the company's contact center.

Figure 3:
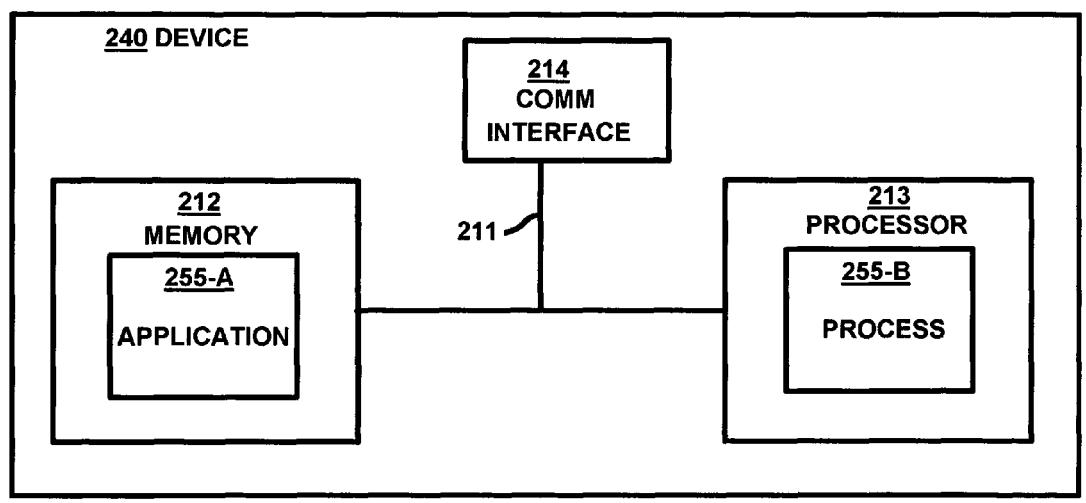
FIG. 3 illustrates an example computer system architecture for a computer system that provides additional information to an IVR system user in accordance with embodiments of the invention.

FIG. 3 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the agent application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of providing additional information to an Interactive Voice Response (IVR) system user, the method comprising:
   receiving, at the IVR system, a call from a user;
   providing a session for the user;
   generating a page for said session;
   communicating the page to the user; and
   dynamically updating the page for said user as said user traverses menus of said IVR system, wherein said dynamically updating the page for said user as said user traverses menus of said IVR system comprises providing meta information relating to an IVR menu traversed by said user.

2. The method of claim 1 further comprising ending the call.

3. The method of claim 2 further comprising at least one of the group consisting of deleting said page, storing said page for a predetermined period of time, and emailing the page to the user.

4. The method of claim 1 wherein said generating a page for said session comprises generating an HyperText Mark-up Language (HTML) page and wherein said communicating the page to the user comprises providing a Universal Resource Locator (URL) of the HTML page to said user.

5. The method of claim 4 wherein said providing a URL of the HTML page to said user comprises one of the group consisting of reading the URL to the user by said IVR and sending a Short Message Service (SMS) message to said user.

6. The method of claim 1 wherein said generating a page comprises generating a page including at least one of the group consisting of plain text, a link to another page, video, audio, a flash image and attachments.

7. A non-transitory computer readable medium having computer readable code thereon for providing additional information to an Interactive Voice Response (IVR) system user, the medium comprising:
   instructions for receiving, at the IVR system, a call from a user;
   instructions for providing a session for the user;
   instructions for generating a page for said session;
   instructions for communicating the page to the user; and
   instructions for dynamically updating the page for said user as said user traverses menus of said IVR system, wherein said dynamically updating the page for said user as said user traverses menus of said IVR system comprises providing meta information relating to an IVR menu traversed by said user.

8. The computer readable medium of claim 7 further comprising instructions for ending the call.

9. The computer readable medium of claim 8 further comprising instructions for at least one of the group consisting of deleting said page, storing said page for a predetermined period of time, and emailing the page to the user.

10. The computer readable medium of claim 7 wherein said instructions for generating a page for said session comprises instructions for generating a HyperText Mark-up Language (HTML) page and wherein said communicating the page to the user comprises providing a Universal Resource Locator (URL) of the HTML page to said user.

11. The computer readable medium of claim 10 wherein said instructions for providing a URL of the HTML page to said user comprises instructions for one of the group consisting of reading the URL to the user by said IVR and sending a Short Message Service (SMS) message to said user.

12. The computer readable medium of claim 7 wherein said instructions for generating a page comprises instructions for generating a page including at least one of the group consisting of plain text, a link to another page, video, audio, a flash image and attachments.

13. A computer system comprising:
   a memory;
   a processor;
   a communications interface;
   an interconnection mechanism coupling the memory, the processor and the communications interface; and
   wherein the memory is encoded with an application providing additional information to an Interactive Voice Response (IVR) system user, that when performed on the processor, provides a process for processing information, the process causing the computer system to perform the operations of:
   receiving, at the IVR system, a call from a user;
   providing a session for the user;
   generating a page for said session;
   communicating the page to the user; and
   dynamically updating the page for said user as said user traverses menus of said IVR system, wherein said dynamically updating the page for said user as said user traverses menus of said IVR system comprises providing meta information relating to an IVR menu traversed by said user.

14. The method of claim 13 further comprising ending the call.

15. The method of claim 14 further comprising at least one of the group consisting of deleting said page, storing said page for a predetermined period of time, and emailing the page to the user.

16. The method of claim 13 wherein said generating a page for said session comprises generating a HyperText Mark-up Language (HTML) page and wherein said communicating the page to the user comprises providing a Universal Resource Locator (URL) of the HTML page to said user.

17. The method of claim 16 wherein said providing a URL of the HTML page to said user comprises one of the group consisting of reading the URL to the user by said IVR and sending a Short Message Service (SMS) message to said user.

18. The method of claim 13 wherein said generating a page comprises generating a page including at least one of the group consisting of plain text, a link to another page, video, audio, a flash image and attachments.

19. The method of claim 1 wherein said page is accessed by said user while said user is navigating a menu of said IVR system.

20. The computer readable medium of claim 7 wherein said page is accessed by said user while said user is navigating a menu of said IVR system.

21. The computer system of claim 13 wherein said page is accessed by said user while said user is navigating a menu of said IVR system.

* * * * *